INVENTORS
ALFRED V. CAHAL -AND-
BENJAMIN F. BOURNE.

Willard S. Gnew
ATTORNEY.

United States Patent Office 3,370,990
Patented Feb. 27, 1968

3,370,990
BATTERY CORROSION ELIMINATOR
Alfred V. Cahal, 2210 W. Cheery Lynn, Phoenix, Ariz. 85015, and Benjamin F. Bourne, 2233 W. Sunnyside Ave., Phoenix, Ariz. 85021
Filed Dec. 10, 1965, Ser. No. 512,939
3 Claims. (Cl. 136—181)

ABSTRACT OF THE DISCLOSURE

A battery corrosion eliminator attached under the battery filler caps and extending over the vent holes of the caps to neutralize the effects of gases and fumes discharging from the filler cap vents so as to keep the battery terminals free of corrosion.

This invention pertains to apparatus for eliminating corrosion from storage batteries and is particularly adapted to use with and as an attachment for existing batteries.

One of the objects of this invention is to provide a device adapted to be attached to the battery filler caps and to extend over the vent holes of the caps to neutralize the effects of the gases and fumes discharging from the filler cap vents.

Still another object is to provide a battery corrosion eliminator which controls the effects of the gaseous discharges from the vent holes in the filler caps so as to prevent discharge of acid fumes and moisture from the battery interior from contaminating the top surface causing current leakage between the terminals.

Further features and advantages of this invention will appear from a detailed description of the drawings in which.

Figure 1:
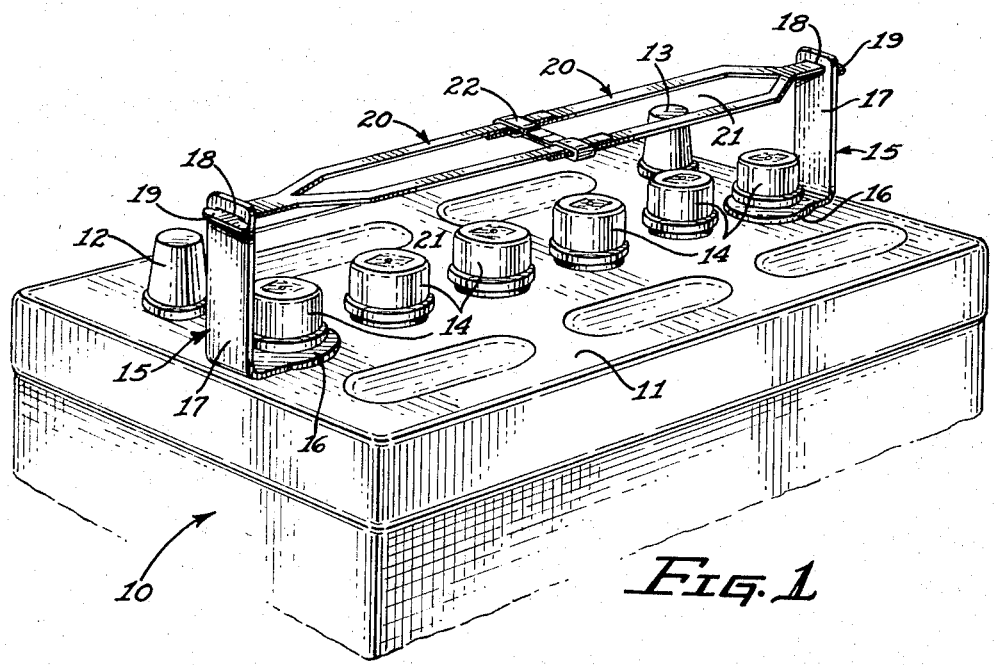
FIG. 1 is a perspective view showing a battery with the apparatus of this invention applied thereto.
Figure 2:
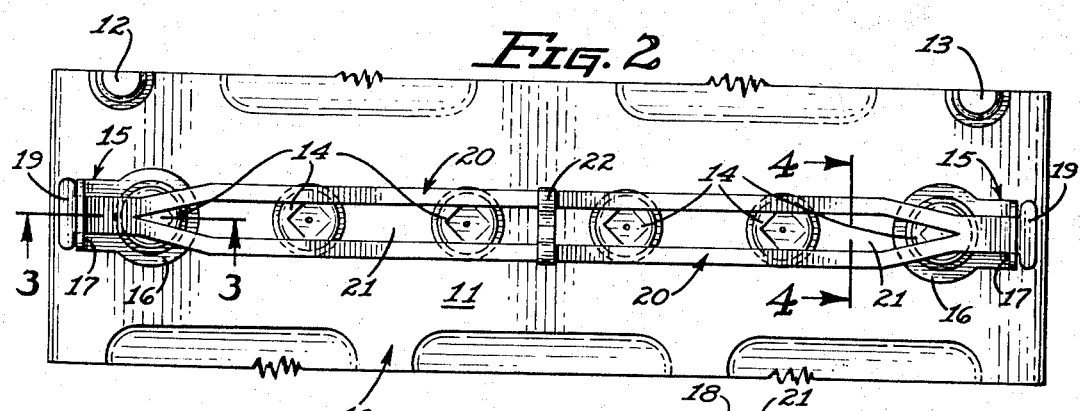
FIG. 2 is a plan view of the apparatus shown in FIG. 1.
Figure 3:
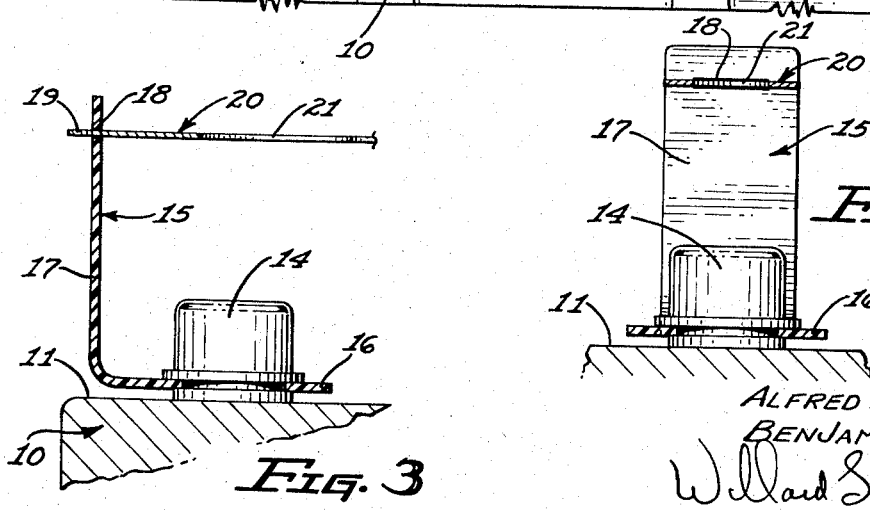
FIG. 3 is an enlarged fragmentary sectional view of the apparatus shown in FIGS. 1 and 2 taken on line 3—3 of FIG. 2, showing one of the insulative supports attached under a filler cap.
Figure 4:
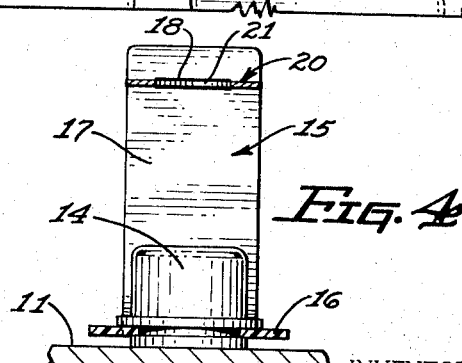
FIG. 4 is an enlarged sectional view taken on line 4—4 of FIG. 2 showing one of the insulative supports for attaching the device to the battery, secured under a filler cap.

As an example of one embodiment of this invention, there is shown a conventional wet cell storage battery such as used for automobiles having the usual case 10 and the top 11 from which project the terminals 12 and 13 and the filler caps 14.

The corrosion eliminator of this invention comprises a pair of spaced semi-rigid plastic support members 15 having mounting eyelets 16 which are secured under the end filler caps 14 and upwardly extending arms 17 having mounting slits 18 adapted to supportingly receive the T-shaped ends 19 of each of the copper corrosion controlling members 20.

Each of the members 20 are preferably bifurcated to form a longitudinally extending slot 21 which is positioned over the tops and vent holes of the battery filler caps 14. The two corrosion controlling members are telescopically connected together by suitable clips 22 which are crimped about the mutually engaged pair of members 20 for the required spacing of the support members as dictated by the size of the battery upon which it is mounted. By this arrangement the gaseous fumes and moisture issuing from the battery filler cap vents is absorbed and controlled by the presence of the copper controlling members 20 so that it does not become deposited on the top 11 of the battery.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendant claims are intended to be included herein.

Having thus fully set forth and described this invention what is claimed and desired to be obtained by United States Letters Patent is:

1. A corrosion eliminator for a battery comprising in combination:
   (A) a plurality of filler caps having vents therein,
   (B) a pair of electrical terminals spaced from said filler caps,
   (C) and a corrosion eliminator element including,
   (D) a metallic elongated member extending over said filler caps and said vent holes thereof,
   (E) and means secured under vent caps of said battery and connected to said corrosion eliminator element to support said element in operative position above said caps.

2. A corrosion eliminator as in claim 1 wherein said corrosion eliminator element comprises a plurality of parallel strips extending over said filler caps each side of and adjacent to the vent holes thereof.

3. A corrosion eliminator as in claim 1 wherein said last mentioned means comprises a pair of semi-rigid plastic insulative support members demountably secured under spaced vent caps of said battery.

References Cited

UNITED STATES PATENTS

| 3,018,317 | 1/1962 | Salis | 136—181 |
| 3,253,964 | 5/1966 | Douglass | 136—181 |

FOREIGN PATENTS

| 639,484 | 4/1962 | Canada. |

ALLEN B. CURTIS, Primary Examiner.

WINSTON A. DOUGLAS, Examiner.

D. L. WALTON, Assistant Examiner.